US011434394B2

(12) United States Patent
Yap et al.

(10) Patent No.: US 11,434,394 B2
(45) Date of Patent: Sep. 6, 2022

(54) ADHESIVE HAVING INCREASED BONDING STRENGTH

(71) Applicants: The Procter & Gamble Company, Cincinnati, OH (US); Agency for Science, Technology & Research, Singapore (SG)

(72) Inventors: Fung Ling Yap, Singapore (SG); Chang Sheng Lee, Singapore (SG); Siew Ling Chong, Singapore (SG); Zhan Cheng, Beijing (CN)

(73) Assignees: The Procter & Gamble Company, Cincinnati, OH (US); Agency for Science, Technology and Research, Singapore (SG)

( * ) Notice: Subject to any disclaimer, the term of this patent is extended or adjusted under 35 U.S.C. 154(b) by 39 days.

(21) Appl. No.: 15/931,637

(22) Filed: May 14, 2020

(65) Prior Publication Data
US 2020/0270482 A1 Aug. 27, 2020

(51) Int. Cl.
*C09J 7/30* (2018.01)
*C09J 7/28* (2018.01)

(52) U.S. Cl.
CPC . *C09J 7/28* (2018.01); *C09J 7/30* (2018.01); *C09J 2301/10* (2020.08); *C09J 2301/122* (2020.08); *C09J 2301/20* (2020.08); *C09J 2423/16* (2013.01); *Y10T 428/14* (2015.01)

(58) Field of Classification Search
CPC ... C09J 7/28; C09J 7/30; C09J 2301/10; C09J 2301/122; C09J 2301/20; C09J 2423/16; C09J 2301/204; Y10T 428/14
See application file for complete search history.

(56) References Cited

U.S. PATENT DOCUMENTS

| 6,171,648 | B1* | 1/2001 | Himmelsbach ......... A61L 15/58 427/208.2 |
| 2005/0148984 | A1 | 7/2005 | Lindsay |
| 2011/0016675 | A1 | 1/2011 | Mayers |
| 2012/0052234 | A1 | 3/2012 | Natarajan |
| 2012/0107570 | A1 | 5/2012 | Ross |
| 2012/0295068 | A1 | 11/2012 | Cutkosky |
| 2013/0319522 | A1 | 12/2013 | Koike |
| 2017/0249877 | A1 | 8/2017 | Han |
| 2018/0107047 | A1 | 4/2018 | Yin |

FOREIGN PATENT DOCUMENTS

| CA | 2378596 A1 | 2/2001 |
| CN | 107244133 A | 10/2017 |
| WO | WO2007109213 A2 | 9/2007 |
| WO | WO2010096023 A1 | 8/2010 |

OTHER PUBLICATIONS

International Search Report and Written Opinion dated Sep. 4, 2018, PCT/CN2017/116872, 11 pgs.
Supplementary International Search Report, PCT/CN2017/116872 dated Feb. 21, 2020, 6 pgs.

* cited by examiner

*Primary Examiner* — Patricia L. Nordmeyer
(74) *Attorney, Agent, or Firm* — Steven Robert Chuey; Sarah M DeCristofaro

(57) ABSTRACT

Articles having a thermal imprinted adhesive on a substrate of a plurality of certain conicals have improved bonding strength.

20 Claims, 3 Drawing Sheets

ADHESIVE HAVING INCREASED BONDING STRENGTH

FIELD OF THE INVENTION

The present invention relates to articles having thermal imprinting to improve the bonding strength of adhesives on a substrate.

BACKGROUND OF THE INVENTION

Use of adhesives are well known. There are many theories to explain the mechanism of adhesion including mechanical interlocking, diffusion, electrostatic, adsorption, and combinations thereof. Thermal imprinting is one way of improving bonding strength of an adhesive. There is on-going need to improve the adhesive bonding strength of adhesives given the variety of benefits and applications of adhesives, especially leveraging techniques as thermal imprinting.

SUMMARY OF THE INVENTION

The present invention is based, in part, on the surprising discovery that imparting certain structures to an adhesive, on a nanometer or sub-micrometer scale, via thermally imprinting, desirably increases bonding strength. At least one aspect of the invention provides for an article comprising a thermally imprinted adhesive on a substrate, wherein the adhesive has an externally facing structure of a first conical and a second conical. The first and second conical are adjacent but discrete from each other. And the first and second conceals each independently have a width of 50 nm to 2,000 nm and a height from 5 nm to 100 nm.

These and other features, aspects, and advantages of examples of the present invention will become evident to those skilled in the art from the detailed description which follows.

BRIEF DESCRIPTION OF THE DRAWINGS

While the specification concludes with claims particularly defining and distinctly claiming the invention, it is believed that the invention will be better understood from the following description of the accompanying figures:

DETAILED DESCRIPTION OF THE INVENTION

Figure 1:
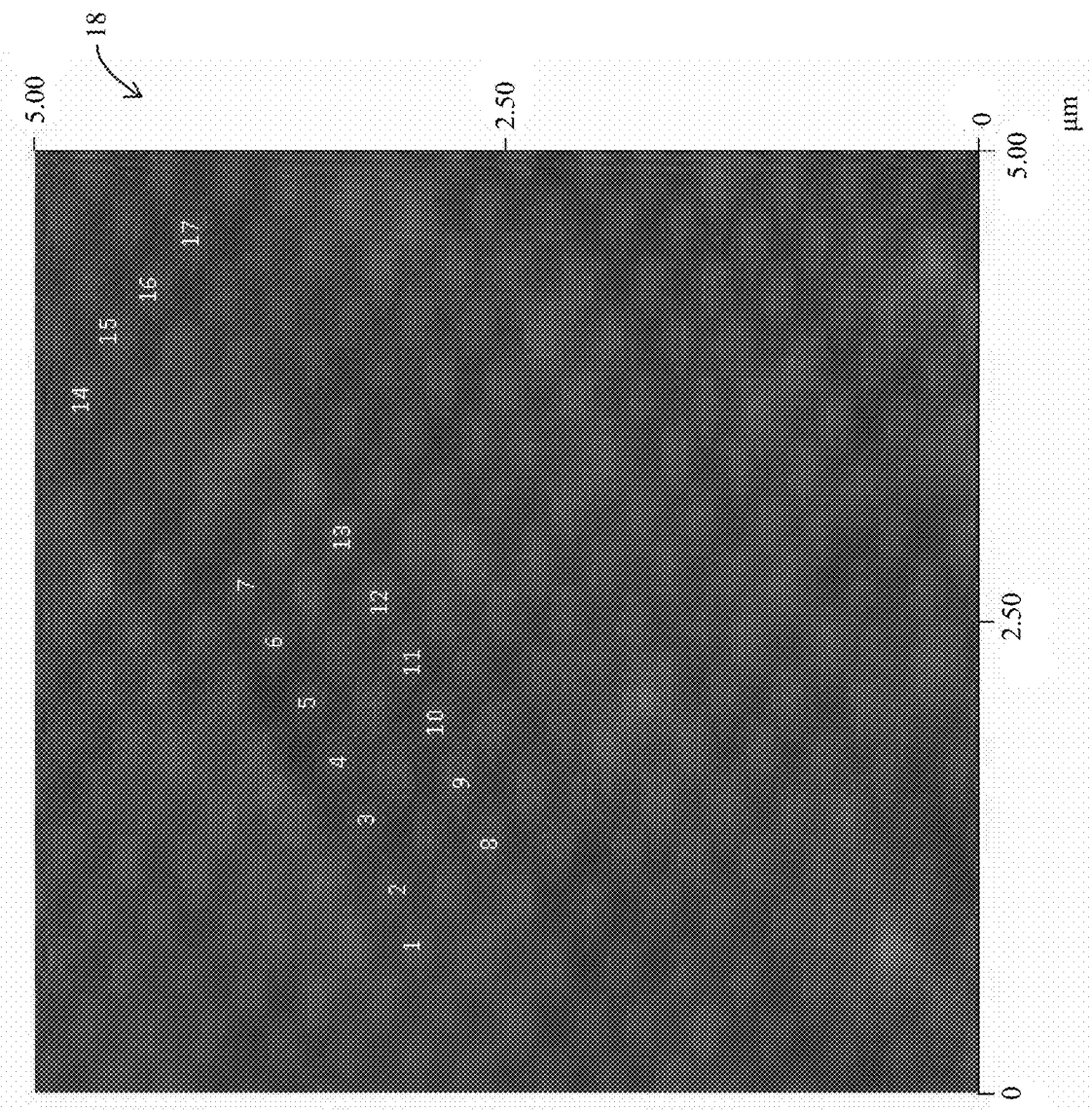
FIG. 1 is Atomic Force Microscopy ("AFM") image of an inventive example of a thermally imprinted adhesive, wherein the adhesive has an externally facing structure of a plurality of conicals of a nanometer scale.

As used herein, the term "article" refers to any article, in the broadest, where an adhesive on a substrate having an improved bonding strength is desirable. Non-limiting examples include wipes, diapers, feminine hygiene, and packaging and containers, especially those for fast-moving consumer goods.

As used herein, the term "substrate" refers to any surface on which the adhesive may be thermally imprinted. The substrate may include paper, plastic, metal, glass, fabric, non-woven, or combinations thereof. Preferably the substrate comprises a material selected from the group consisting of aluminum, ethylene acrylic acid copolymer (EEA), ethylene-methyl acrylate copolymer (EMA), ethylene vinyl acetate copolymer (EVA), glass, high density polyethylene (HDPE), low density polyethylene (LDPE), ultra-low density polyethylene (ULDPE), modified polyethylene (mPE), nylon, polycarbonate (PC), polyethylene terephthalate (PET), plastomers, polymethylmethacrylate (PMMA), Polypropylene (PP), polyvinyl chloride (PVC), styrene-ethylene-butylene-styrene (SEBS), thermoplastic elastomers (TPE), combinations thereof.

As used herein, the term "adhesive" means any substance that is on the surface of a substrate that imparts adhesive properties. The adhesive can be applied on to a substrate or thermally co-extruded as a surface layer of the substrate. Preferably the adhesive is polymeric material(s) thermally co-extruded as the surface layer in the formation of the substrate. These polymeric materials are also known as tacky polymers. Non-limiting examples of these polymers include polyethylenes having a low density, such as low density polyethylene (LDPE) and ultra-low density polyethylene (ULDPE). Other examples may include: polyolefin elastomers (POE), such as polypropylene based elastomer and polyethylene based elastomer; thermoplastic elastomers (TPE), such as thermoplastic polyurethanes; styrene-ethylene-butylene-styrene (SEBS); ethylene-methyl acrylate copolymer (EMA), and the like. Common characteristics for many desirable polymeric adhesives include those having flexible molecular chains, and from low to no crystallinity. More preferably the adhesive is a polyethylene polymer or polyolefin, more preferably polyolefin, even more preferably polyolefin elastomer. One non-limiting example of a commercially available adhesive is VISTAMAXX™ series from ExxonMobil, a propylene-based elastomer. The material of the adhesive and substrate can be one in the same.

One way to measure adhesion is through bonding strength (Newton/cm$^2$). The adhesive may have a bonding strength greater than 10 N/cm$^2$; preferably greater than 13 N/cm$^2$, more preferably greater than 17 N/cm$^2$, more preferably greater than 18 N/cm$^2$, yet more preferably greater than 18.5 N/cm$^2$.

As used herein, the term "thermal imprinting" means the use of heat and pressure on a mold, wherein the mold contains engraving or etching of a structure that is to be transferred, at least in part, to the target imprint surface. The mold can be engraved or etched by laser, plasma, or chemical means. The temperature and pressure will depend upon, at least in part, on the materials used for the adhesive (and substrate) and application etc. Non-limiting examples of the temperature employed may include 90° C. to 200° C., or 110-170° C., or 130-150° C. Non-limiting examples of pressure employed may include 5 bars to 100 bars, or 20-60 bars, or 30-50 bars. One bar is 100,000 pascals. The mold, for example, can be made from metal (e.g., nickel) or silicon. A typically mold imprinting area may be from 0.5 mm$^2$ to 50 mm$^2$, or 1-25 mm$^2$. Preferably the present invention has incrementally greater bonding strength, relative to a control substrate without imprinting, greater than 1.5, preferably greater than 1.75, more preferably greater than 2, yet more preferably greater than 2.5, yet still more preferably at or greater than 2.6.

FIG. 1 is an example of thermal imprinted adhesive (18) of the present invention. The adhesive is VISTAMAXX, series grade 6102FL, that is thermally extruded as a substrate with thickness of about 100 micrometers. No other materials are present.

A metal mold is used to thermally imprint said adhesive. The mold have a hexagonal pattern of circular cones rounded at the apex having a height of 220 nm, and with a periodicity of 350 nm in-between the cones. The metalmold is cleaned in an ultrasonic bath using acetone, followed by isopropanol, and finally rinsed in deionized water. The mold is then dried in a stream of dry nitrogen; and finally placed in a clean oven at 100° C. for 1 hour. The mold is further treated with a fluorosilane release agent through vapor deposition of 1H,1H,2H,2H-perfluorodecyltrichlorosilane self-assembled monolayer. A nanoimprinter from Obducat (Sweden) is used for the thermal imprinting. The mold and the target substrate are both heated to 140° C., and a pressure of 40 bars is applied for 400 seconds between the mold and the target substrate to let the polymer flow into the cavities of the mold. The pressure is released upon cooling to 40° C. The thermal imprinted substrate is then peeled off from the mold.

Referring to FIG. 1, the resulting external facing structure is observable by Atomic Force Microscopy (AFM). Briefly, AFM is a very high resolution type of scanning probe microscopy having resolution in the orders of fractions of a nanometer. The AFM is provided with a Dimension Icon (Bruker Corp, U.S.A.). Point probe silicone tips are from Nanosensors (Switzerland). The image of FIG. 1 is acquired with 512×512 data acquisition at a scan speed of 1 Hz. The Nanoscope software (Bruker) is used to analyze the images include dimensional aspects of width and height.

The external facing structure has a plurality of conicals left from the imprinting. The term "conical" means a protrusion in the general shape of a cone, i.e., wherein the base tapers to a single apex. The apex of the conical may form a point or may be rounded. A cross section of the conical, especially at or near the base, may be generally circular, elliptical, polygonal (regular or irregular), preferably circular. The height is the greatest vertical distance of the conical (i.e., in a longitudinal axis (orthogonal from the surface of the substrate)), while the width is the greatest width dimension (i.e., in a plane parallel to the surface of the substrate). Seventeen total conicals are assessed for width and height, and averages therein provided. A first group of conicals (1-5) are along a first linear plane. A second group of conicals (8-13) are also along a second linear plane. The first and second linear planes are parallel to each other. A third group of conicals (14-17) are in a third linear plane. The third linear plane is about 30 degrees from the first and second planes. Table 1 provides the width and height data for these conicals (1-17) per AFM.

TABLE 1

Width and height for conicals assessed.

| Conical | Width (nm) | Height (nm) |
|---|---|---|
| 1 | 362 | 35.09 |
| 2 | 329 | 29.90 |
| 3 | 395 | 31.23 |
| 4 | 296 | 29.69 |
| 5 | 362 | 34.30 |
| 6 | 384 | 33.94 |
| 7 | 296 | 34.30 |
| 8 | 329 | 29.62 |
| 9 | 372 | 39.6 |
| 10 | 310 | 28.82 |
| 11 | 358 | 36.3 |

TABLE 1-continued

Width and height for conicals assessed.

| Conical | Width (nm) | Height (nm) |
|---|---|---|
| 12 | 372 | 37.92 |
| 13 | 317 | 39.03 |
| 14 | 328 | 25.89 |
| 15 | 363 | 26.94 |
| 16 | 339 | 32.56 |
| 17 | 339 | 34.63 |
| Average: | 344 +/− 30 | 32.9 +/− 4.1 |

The thermally imprinted substrate of FIG. 1 is tested and has bonding strength of 19.5+/−0.75 N/cm$^2$. The method to test for bond strength is measured using the Instron™ 5543 Single Column Universal Testing apparatus. Generally, the machine contains two flat platforms that travel away from each other during the testing, putting a tensile load on the sample that is adhered between them. The force for separation of the two plates is measured. The bottom platform is rigid, while the top platform has some degree of movement such that the two platforms can self-align to ensure good contact. An improvement factor of 2.64 in bonding strength is observed compared to control adhesive with identical chemistry but without any imprinting.

One aspect of the invention provides for an article comprising a thermally imprinted adhesive on a substrate. The adhesive has an externally facing structure of a first conical and a second conical, wherein the first and second conical are adjacent but discrete from each other. The first and second conicals each independently have a width of 50 nm to 1,000 nm, preferably 100-1,500 nm, more preferably from 150-1,000 nm, yet more preferably from 200-500 nm. The first and second conicals each independently have a height from 5 nm to 100 nm, preferably from 10 nm to 60 nm, more preferably from 15 to 50 nm, yet more preferably from 20-45 nm, yet still more preferably from 35-45 nm.

The externally facing structure preferably has a plurality of conicals, i.e., a third, fourth, fifth, or more conicals. A third conical is discrete, and is adjacent to either the first conical or the second conical or both. Preferably the third conical has width of 50 nm to 1,000 nm and a height from 5 nm to 100. More preferably the third conical has a height from 10-60 nm, preferably from 15-50 nm, more preferably from 20-45 nm, yet more preferably from 35-45 nm. Yet more preferably the third conical has a width from 100-1,500 nm, preferably from 150-1,000 nm, more preferably from 200-500 nm. A fourth conical is discrete, and is adjacent to the first, second, third conical, or combination thereof. The fourth conical has a width from 50 nm to 2,000 nm, preferably from 100-1,500 nm, more preferably from 150-1,000 nm, yet more preferably from 200-500 nm. The fourth conical has a height from 5 nm to 100 nm, preferably from 10-60 nm, more preferably from 15-50 nm, yet more preferably from 20-40 nm, yet still more preferably from 25-35 nm. A fifth or more conicals are each discrete, and wherein at least one of the fifth or more conicals is adjacent to first, second, third, fourth conical, or combination thereof. The fifth or more conicals each independently have a width of 50 nm to 1,000 nm, preferably from 100-1,000 nm, more preferably from 150-1,000 nm, yet even more preferably from 200-500 nm. The fifth or more conicals each independently have a height from 5 nm to 100 nm, preferably from 10-60 nm, more preferably from 15-50 nm, even more preferably from 20-45 nm, yet still more preferably from 35 to 45 nm. Preferably one or more of the conicals each has an height:width ratio of less than 1, preferably less than 0.7, more preferably less than 0.5, yet more preferably less than 0.3, yet even more preferably less than 0.2. Preferably the height:width ratio is measured by Atomic Force Microscopy.

Preferably one or more of the conicals are in a linear plane. Preferably one or more of the conicals have a periodicity from 50 nm to 1000 nm, preferably from 100 nm to 500 nm, more preferably 200 nm to 400 nm, yet more preferably from 300 nm to 400 nm, yet still more preferably from 350 nm to 400 nm. The term "periodicity" is the distance measured from the apex of a conical to the apex of another conical. Preferably the externally facing structure has a density of 1-12 conicals per square micrometer, preferably from 5 to 10 conicals per square micrometer. Preferably the conicals are arranged in a hexagonal pattern. Other patterns may include hexagonal, rectangular, square, random pattern, or combination. A hexagonal pattern is preferred to maximize bonding strength.

Comparative Examples

Figure 2:
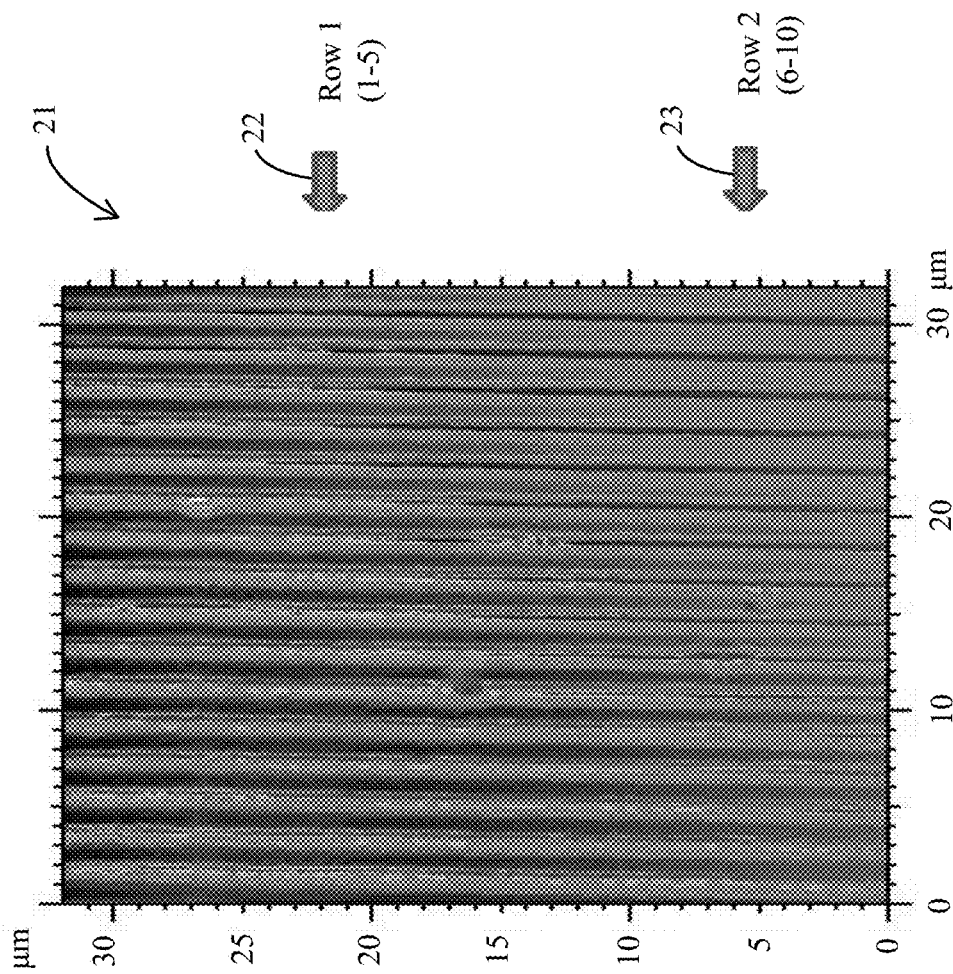
FIG. 2 is a three-dimensional Optical Metrology System ("3D OMS") image of a comparative example of a thermally imprinted adhesive, wherein the adhesive has an externally facing structure of a plurality of parallel "V-grooves" of a micrometer scale.

The FIG. 2 is a comparative example of thermal imprinted adhesive (21) wherein the external facing structure has a plurality of parallel V-grooves having repeating sets of peaks and valleys, organized in an essentially up-and-down manner in FIG. 2. The conditions for making this comparative example are generally the same as the inventive example, except notably the adhesive has an externally facing structure of "V-grooves" on a micron scale. The corresponding mold is plasma etched as to have a V-groove pattern having a horizontal peak-to-peak distance (i.e., periodicity) of 2 micrometers; vertical peak to valley height from 1.4 micrometers; and an angle of the groove of 54.74 degrees (relatively to vertical). Referring to FIG. 2, the resulting external facing structure is observable by three-dimensional Optical Metrology System ("3D OMS"), specifically Leica DCM 3D (Leica Microsystems, Germany) equipped with a 405 nm laser. Images are processed and geometries extracted with commercially available software. Still referring to FIG. 2, the horizontal peak to peak distance and peak to valley height are assessed. There is a first row (22) of five data points and a second row (23) of give additional data points to calculate average values. The average horizontal peak-to-peak distance is 1.977+/−0.0484; and the average peak to valley height is 1.556+/−0.1432. The data is collected per 3D OMS.

The thermally imprinted substrate of FIG. 2 is tested for bond strength at 13.0+/−0.15 N/cm$^2$. This is much lower than inventive example which is at 19.5. The aforementioned method issued to test for bond strength.

Without wishing to be bound by theory, the discrete conicals of the present invention provide multiple contact points to require a higher strength to detach propagation along multiple discrete structures as compared to a continuous structure such as V-groove of this comparative example. In addition, discrete conicals are more tolerant to misaligned contact and thus less bond strength is compromised from the misaligned areas. The comparative data of FIG. 2 ostensibly demonstrates the importance of a discrete structures (vs. continuous structures).

Figure 3:
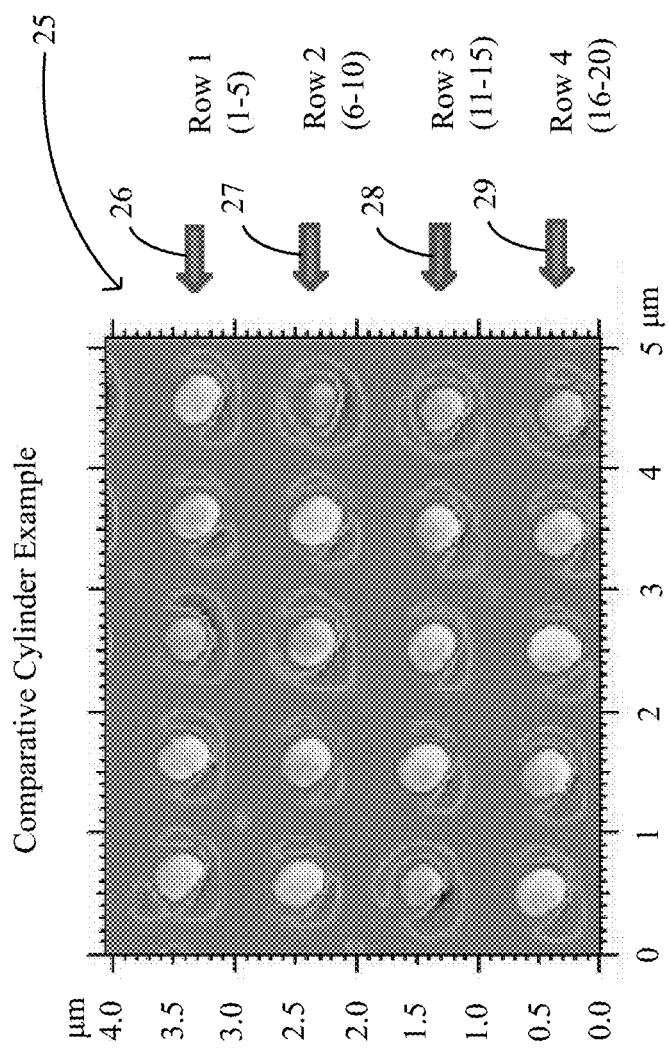
FIG. 3 is an 3D OMS image of a comparative example of a thermally imprinted adhesive, wherein the adhesive has an externally facing structure of a plurality of discrete right circular cylinders of a nanometer scale.

The FIG. 3 is a comparative example of a substrate adhesive polymer thermal imprinted with on a substrate (25) wherein the external facing structure has a plurality of right circular cylinders organized in a square array. The conditions for making this comparative example are generally the same as the inventive example, except notably the adhesive has an externally facing structure of right circular cylinders on nanometer scale. The corresponding mold is plasmaetched as to have a corresponding structure having a depth of 500 nanometers, a diameter of 500 nanometers, and an edge to edge spacing between right circular cylinders of 500 nanometers and arranged in a square array. Referring to FIG. 3, the resulting external facing structure is observed by 3D OMS (as previously described for the comparative example of FIG. 2). Still referring to FIG. 3, the diameter and height of the right circular cylinders are assessed. The average is determined by assessing 20 data points from rows 1-4 (26, 27, 28, 29, respectively). The average diameter is 463+/−33.3 nanometers and the average height is 461+/−30.5 nanometers. The data is collected per 3D OMS.

The thermally imprinted substrate of FIG. 3 is tested for bonding strength at 5.14+/−1.53 N/cm$^2$. This is much lower than the inventive example which is at 19.5 and comparative example of FIG. 2 of 13.0.

Although not show, right circular cylinders of even higher/larger dimensions show even worse results. For example, data generated on substrates wherein the external facing structure having right circular cylinders having an average diameter of 1.131+/−33.3 microns and a height of 622 nanometers +/− demonstrate a bonding strength at only 3.29+/−N/cm$^2$, which is much worse than the data provided for the comparative example of FIG. 3 of 5.14. Even larger right circular cylinders had even worse bonding strength data. Data generated on substrates wherein the external facing structure having on right circular cylinders having an average of diameter of 7.84+/−0.649 micrometers and a height of 1.82+/−0.1333 micrometers demonstrate at bonding strength of 0.44+/−0.062 micrometers.

Without wishing to be bound by theory, the aspect ratio, i.e., characteristic of a conical, is important. And the nanometer dimensions are likely important given the trend toward small structures evidenced by inter alia the right circular cylinders.

Unless otherwise indicated, all percentages, ratios, and proportions are calculated based on weight of the total composition. All temperatures are in degrees Celsius (° C.) unless otherwise indicated. All measurements made are at 25° C., unless otherwise designated. All component or composition levels are in reference to the active level of that component or composition, and are exclusive of impurities, for example, residual solvents or by-products, which may be present in commercially available sources.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An article comprising a thermally imprinted adhesive on a substrate,
    wherein the adhesive has an externally facing structure of a first conical and a second conical,
    wherein the first and second conicals are adjacent but discrete from each other, and
    wherein the first and second conicals each independently have a width of 50 nm to 1,000 nm and a height from 5 nm to 100 nm.

2. The article of claim 1, wherein the first and second conicals have a periodicity from 50 nm to 1000 nm.

3. The article of claim 1, wherein the first and second conicals each independently have a height from 10 nm to 60 nm.

4. The article of claim 1, wherein the first and second conicals each independent have a width from 100 nm to 1,500 nm.

5. The article of claim 1, comprising a third conical, wherein the third conical is discrete, and is adjacent to either the first conical or the second conical, wherein the third conical has width of 50 nm to 1000 nm and a height from 5 nm to 100 nm.

6. The article of claim 5, wherein the first, second, and third conicals are in a linear plane, and wherein the periodicity between the third conical and either the first or second conical is from 50 nm to 1000 nm.

7. The article of claims 5, comprising a fourth conical, wherein the fourth conical is discrete, and is adjacent to the first, second, or third conical, and wherein the fourth conical has a width from 50 nm to 2000 nm and a height from 5 nm to 100 nm.

8. The article of claim 7, wherein the first, second, third, and fourth conical are in a linear plane, and wherein the periodicity between the fourth conical and that of the first, second, or third conical is from 50 nm to 1000 nm.

9. The article of claim 7, comprising a fifth conical, wherein the fifth conical is discrete, and wherein the fifth conical is adjacent to first, second, third, or fourth conical, and wherein the fifth conical has a width of 50 nm to 1000 nm and a height from 5 nm to 100 nm.

10. The article of claim 1, wherein at least the first conical has a height:width ratio of less than 1.

11. The article of claim 1, wherein at least the first and second conical each has a height:width ratio of less than 1.

12. An article comprising a thermally imprinted adhesive on a substrate,
    wherein the adhesive has an externally facing structure comprising a plurality of conicals,
    wherein each of the plurality of conicals are adjacent but discrete from each other,
    wherein the plurality conicals each independently have a width of 50 nm to 1000 nm and a height from 5 nm to 100 nm, and
    wherein the plurality of conicals have a density of 1-12 per square micro meter.

13. The article of claim 12, wherein the plurality of conicals are arranged in a pattern selected from the group consisting of hexagonal, rectangular, square, random pattern, or combination; preferably in a hexagonal pattern.

14. The article of claim 12, wherein the adhesive is polymeric.

15. The article of claim 12, wherein the substrate is selected from the group consisting of paper, plastic, metal, glass, fabric, non-woven, or combinations thereof.

16. The article of claim 12, wherein the substrate is selected from the group consisting of aluminum, ethylene acrylic acid copolymer (EEA), ethylene-methyl acrylate copolymer (EMA), ethylene vinyl acetate copolymer (EVA), glass, high density polyethylene (HDPE), low density polyethylene (LDPE), ultra-low density polyethylene (ULDPE), modified polyethylene (mPE), nylon, polycarbonate (PC), polyethylene terephthalate (PET), plastomers, polymethylmethacrylate (PMMA), Polypropylene (PP), polyvinyl chloride (PVC), styrene-ethylene-butylene-styrene (SEBS), thermoplastic elastomers (TPE) or combinations thereof.

17. The article of claim 12, wherein the adhesive has a bonding strength greater than 10 N/cm$^2$.

18. The article of claim 12, wherein the plurality of conicals are in a linear plane.

19. An article comprising a thermally imprinted adhesive on a substrate,
    wherein the adhesive has an externally facing structure of a first conical and a second conical,
    wherein the first and second conicals are adjacent but discrete from each other,
    wherein the first and second conicals each independently have a width of 50 nm to 1,000 nm and a height from 5 nm to 100 nm, and wherein at least the first and second conical each has a height:width ratio of less than 1.

20. The article of claim 19, wherein the first and second conicals have a periodicity from 100 nm to 500 nm.

* * * * *